Figure 1:
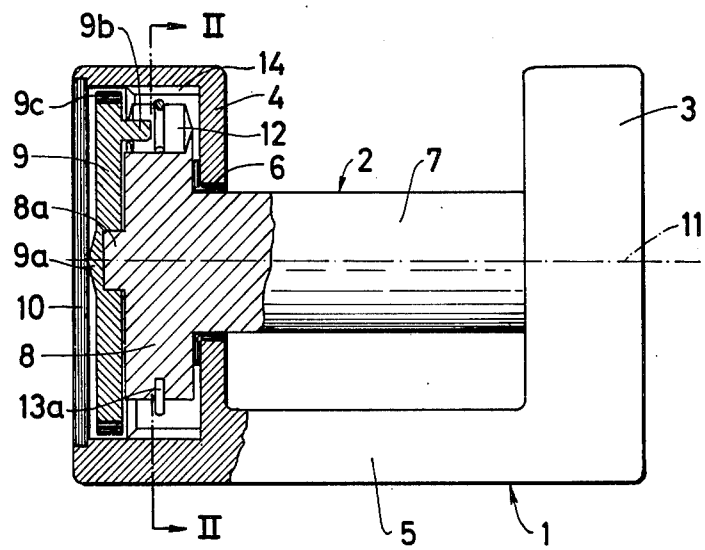

United States Patent [19]

Hjelte et al.

[11] 4,066,222
[45] Jan. 3, 1978

[54] DEVICE IN CONNECTION WITH LOCKING REELING MEANS FOR SAFETY BELTS FOR VEHICLES

[75] Inventors: Sven Roland Hjelte, Vimmerby, Sweden; Lennart Eksell, Valldoreix, Spain

[73] Assignee: Svensk Tryckgjuntning SH AB, Vimmerby, Sweden

[21] Appl. No.: 696,625

[22] Filed: June 16, 1976

[51] Int. Cl.$^2$ .................... A62B 35/02; B65H 75/48
[52] U.S. Cl. ............................................. 242/107.4 B
[58] Field of Search ................ 242/107.4 R–107.4 E; 297/388; 280/744–747

[56] References Cited

U.S. PATENT DOCUMENTS

| | | | |
|---|---|---|---|
| 2,953,315 | 9/1960 | Lautier et al. | 242/107.4 B |
| 2,982,492 | 5/1961 | Spielman | 242/107.4 B |
| 3,341,250 | 9/1967 | Rasmussen | 242/107.4 B X |
| 3,552,676 | 1/1971 | Weber | 242/107.4 B X |
| 3,823,893 | 7/1974 | Svensson | 242/107.4 B X |
| 3,905,562 | 9/1975 | Kell | 242/107.4 B X |
| 3,907,227 | 9/1975 | Takada | 242/107.4 B |

*Primary Examiner*—Stanley N. Gilreath
*Assistant Examiner*—John M. Jillions

[57] ABSTRACT

A device for locking reeling means of safety belts for vehicles is described including a rotatable core element for a safety belt which element is spring biased in the wind-up direction and at one of its ends supports at least one locking body rotatable with the core element, said locking body being designed to assume a locked position upon sudden rapid unwinding of the safety belt by engaging a stationary track situated in a frame to be affixed to a vehicle, a longitudinal groove of trapezoidal cross-sectional area tapering radially and inwardly to form a bottom portion said groove being axially disposed at one end of said rotatable core element, a locking body of from rectangular to square cross-sectional area disposed within said groove and having a bottom portion of a width which substantially corresponds to the width of the bottom portion of said groove, a circumferential groove in the outer portion of said locking body and spring means received by said circumferential groove and retained by said core element resiliently urging said locking body in an inoperative position toward the base of the groove in said core element, and an inertial disk carried on the outer end of said core element adjacent to said locking body and carrying a projection adapted to engage and displace said locking body from said groove, said disk being normally rotatable with said core element but adapted to rotate at a different speed therefrom upon sudden changes in the rotational speed of the core element, thereby permitting the projection on the inertial disk to engage the locking member and displace the same so that said member in turn engages the stationary track and acts as a brake to prevent further rotation of the core element.

4 Claims, 4 Drawing Figures

DEVICE IN CONNECTION WITH LOCKING REELING MEANS FOR SAFETY BELTS FOR VEHICLES

The present invention relates to a device in connection with locking reeling means for safety belts for vehicles comprising a core element, which is spring biased in the winding-up direction, and which element at one of its ends supports at least one locking body, which follows in the movement of rotation of the core element, said body being designed under unnormal conditions with respect to position or movement of the vehicle and/or in connection with an unnormal sudden rapid unwinding of the band forming part of the belt assembly taking place to be capable of being brought to engage a stationary track provided in the frame part of the means in order to impede a continued drawing out of the band of the safety belt.

It is a principal object of the invention to provide a locking means, which is of simple design and of reliable function, and which can stand comparatively high loads.

Said object is reached by a reeling means equipped with the device according to the invention, said means substantially being characterized by the locking body being assymetrical with respect to its rotation, and by its resting in a recess in the core element, against the bottom of which recess it is kept pressed by means of a springing element a carrier element further being provided, which normally follows the movement of rotation of the core element, said carrier element being arranged in connection with a movement at a speed deviating from the speed of the core element by a cooperation with the locking body to strike the same and cause the same to perform a movement of rotation relative to the core element, whereby the locking body engages said track and thereby counteracts a continued rotation of the core element.

Figure 2:
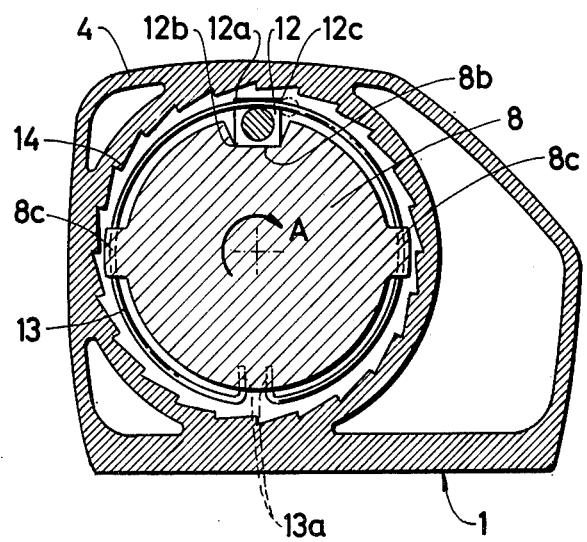
Figure 3:
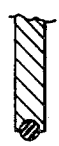
Figure 4:
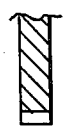

In the following an example of an embodiment of the object of the invention will be described, reference being made to the accompanying drawing, in which FIG. 1 is a partly broken view of a reeling means equipped with a device according to the invention, said device according to the invention in the broken portion being shown in an axial cross-section, FIG. 2 is a cross-sectional view along the line II—II of FIG. 1, FIG. 3 is a sectional view of one embodiment of the inertia disk, and FIG. 4 is a sectional view of another embodiment of the inertia disk.

The reeling means illustrated in the drawing substantially comprises a frame in its entirety indicated with 1 and a core element 2, which at its both ends is rotatably journaled in the frame 1. Said frame 1 exhibits two them interspaced casings 3 and 4 respectively, which in between them are connected by a longitudinal frame portion 5 bridging the distance between them, by means of which frame portion 5 the reeling means usually may be attached to the vehicle in question. The core element 2 is journaled in the walls of the casings 3 and 4 facing each other, preferably pressed into bushings, of which only the one bushing 6 provided in the casing 4 is shown. Spring means are provided in the casing 3, which means can be of known type therefore not requiring any description in this connection, and said springing means tend to rotate the core element 2 in the winding-up direction in order to collect the band of the safety belt in question on the reeling portion 7 of the core. For clarity's sake the bend of the belt is not either appearing in the drawing. The end portion 8 of the core element 2 located in the casing 4 exhibits a flange-like shape and is in its centre designed with a pivot pin 8a, on which a disc-shaped carrier element 9 is rotatably journaled and held in axial position by means of a lid 10, which closes the left side of the casing 4, as seen according to FIG. 1, the carrier disc 9 bearing against the inside of said lid by means of a pointed projection 9a. A groove 8b of trapezoidal cross-section is made in the flange 8 and extends in a parallel direction to the axis 11 of rotation of the core element 2, the bottom of said groove forming the small base of the trapezoid. A locking body 12, which is assymmetric with respect to its rotation and which in the illustrated example of embodiment exhibits a square cross-section, is resting in the groove 8b. The axis of symmetry of the locking body extends in the longitudinal direction of the groove 8b, i.e. parallel to the axis of rotation 11 of the core element 2. The side of the locking body substantially has the same extension in the transverse direction of the groove as the bottom thereof. A spring 13 of annular shape extends along the periphery of the flange 8, and its end portions 13a are bent towards its centre and inserted into corresponding bores in the flange 8, on which the spring 13 is kept in place by means of radially protruding projections 8c with peripherically extending grooves, through which the spring 13 extends. A corresponding groove 12a is turned in the locking body 12, the spring 13 tending to keep the locking body 12 in as deeply pressed position as possible in the groove 8b, i.e. in such a position that the one side of the locking body has a wide bearing against the bottom of the groove 8b, at the same time as the locking body is kept in place counted in the axial direction on account of the position of the spring 13 in the groove 12a. The inner surface of the casing 4 located outside of the flange as counted in radial direction exhibits a path of engagement 14, which in the example of embodiment shown is tooth shaped, but which of course can be a friction path of other kind without therefore departing from the fundamental idea of the invention. The carrier disc 9 exhibits a projection 9b projecting on the side of the locking body 12 in a substantially parallel direction to the same. The carrier disc 9 is suitably made of comparatively heavy material, said disc 9 therefore getting a certain inertia, which is operating in connection with rapid changes of its speed of rotation. In addition the reeling means is provided with means, which sense unnormal changes of the movement of the vehicle, i.e. unnormally high accelerations or retardations. These means can besides sense unnormal positions of inclination of the vehicle or in a reaction activate a locking organ, which in its turn engages the outer edge of the carrier disc in order to brake the speed of the same, so that the principal locking means including the locking body 12 is activated. This activating device sensing movement and/or changes of position can be of in itself known kind, and therefore it is not either described in this application. The carrier disc 9 can in its periphery be provided with a track 9c of engagement, which by way of example can be made of rubber or similar. This track as is shown in FIG. 3 can be made in the form of an O-ring, which is laid in a peripherical groove in the carrier disc 9. The track of engagement can also be made in the form of a toothing, as is shown in FIG. 4.

When the band is violently drawn out, whereby the core element 2 is given a movement of rotaion in the direction of the arrow A, the carrier disc 9 on account of its inertia with its carrier pin 9b will strike against the side of the locking body 12 and cause this body to tilt round its corner 12b, which means that the locking body gets a rotating movement in counter-clockwise direction according to FIG. 2, whereby its corner 12c arrives in engagement with the toothing of the engagement track 14 against bias of the force of the spring 13. A corresponding effect is also reached in connection with rapid movements or changes of position of the vehicle, when the carrier disc 9 by means of the above mentioned locking means is prevented from rotating because of its engagement with the track of engagement 9c of the carrier disc, whereby on account of the pin 9b of the carrier disc bearing against the side of the locking body 12 the latter one is brought into engagement with the toothing 14 as soon as the core element 2 is rotating in the unwinding direction.

The invention is not limited to the embodiment described above and illustrated in the drawing by way of example only, but can be modified with respect to its details within the scope of the following claims without departing from the fundamental idea of the invention. Thus it is for example possible to arrange several locking bodies 12 along the periphery of the flange 8. Notwithstanding that the illustrated embodiment appears to be very advantageous, the invention is not limited to just this design. The locking body can of course exhibit more than four longitudinal lateral surfaces, at the same time as it can exhibit another cross-section than the square one in the case it has just four longitudinal lateral surfaces as in the illustrated example. It is also within the scope of the principal claim to design the locking body with another shape than a parallelepiped.

We claim:

1. Device for locking reeling means of safety belts for vehicles including a frame adapted to be fixed to a vehicle, a stationary track on said frame, a rotatable core element for a safety belt which element is spring biased in the wind-up direction and at one of its ends supports at least one locking body rotatable with the core element, said locking body assuming a locked position upon sudden rapid unwinding of the safety belt by engaging said stationary track, the improvement comprising a longitudinal groove of trapezoidal cross-sectional area tapering radially and inwardly to form a bottom portion, said groove being axially disposed at one end of said rotatable core element, said locking body being of rectangular or square cross-sectional area disposed within said groove and having a bottom portion of a width which substantially corresponds to the width of the bottom portion of said groove, a circumferental groove in the outer portion of said locking body and spring means received by said circumferential groove and retained by said core element for resiliently urging said locking body in an inoperative position toward the base of the groove in said core element, and an inertial disk carried on the outer end of said core element adjacent to said locking body and carrying a projection for engaging and displacing said locking body from said groove, said disk being normally rotatable with said core element but rotating at a different speed therefrom upon sudden changes in the rotational speed of the core element, thereby permitting the projection on the inertial disk to engage the locking member and displace the same so that said member in turn engages the stationary track and acts as a brake to prevent further rotation of the core element.

2. A device according to claim 1 wherein the core element is provided with a flange-like end portion in which the locking body is located and the frame provided with a stationary track including tooth-like members disposed about the outer periphery of said flange-like end portion of the core element.

3. A device according to claim 1 wherein the projection on said inertial disk comprises a stop dog bearable against a side of the locking body.

4. A device according to claim 1, wherein the inertial disk exibits a relatively large mass in relation to the core element in order to facilitate differential rotation of the disk with respect to the core element when the core element is subjected sudden changes in rotation dur to corresponding withdrawal of the safety belt.

* * * * *